United States Patent
Godsey et al.

(10) Patent No.: US 11,316,776 B2
(45) Date of Patent: Apr. 26, 2022

(54) SYSTEM AND METHOD FOR BYPASSING A CONTENT DELIVERY NETWORK (CDN)

(71) Applicant: Charter Communications Operating, LLC, St. Louis, MO (US)

(72) Inventors: Lanny Jason Godsey, St. Louis, MO (US); Glen Hardin, St. Louis, MO (US); John Valiquette, St. Louis, MO (US); Kreig DuBose, St. Louis, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/892,576

(22) Filed: Jun. 4, 2020

(65) Prior Publication Data

US 2021/0385153 A1    Dec. 9, 2021

(51) Int. Cl.
*H04L 45/16* (2022.01)
*H04L 67/10* (2022.01)

(52) U.S. Cl.
CPC .............. *H04L 45/16* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2003/0174648 A1* | 9/2003 | Wang | H04L 67/288 370/235 |
| 2011/0153719 A1* | 6/2011 | Santoro | H04L 43/08 709/203 |
| 2013/0291002 A1* | 10/2013 | Rothschild | H04N 21/6581 725/25 |
| 2014/0075042 A1* | 3/2014 | Giladi | H04L 65/607 709/231 |
| 2014/0189765 A1* | 7/2014 | Green | H04N 21/23805 725/110 |
| 2015/0172747 A1* | 6/2015 | Huang | H04N 21/8586 725/100 |
| 2016/0057460 A1* | 2/2016 | Hao | H04N 21/47202 725/78 |
| 2017/0188059 A1* | 6/2017 | Major | H04B 1/16 |
| 2018/0063705 A1* | 3/2018 | Maslak | H04W 72/0433 |

FOREIGN PATENT DOCUMENTS

CA    2 408 766 A1    4/2003

* cited by examiner

Primary Examiner — Kenny S Lin
(74) Attorney, Agent, or Firm — The Marbury Law Group, PLLC

(57) ABSTRACT

Systems, methods, and devices for delivering content (e.g., multimedia streams, video files, documents, images, text, operating system updates, app store downloads, etc.) from a content source to one or more receiver devices over an internet protocol (IP) network. Network devices may be configured to bypass a content delivery network (CDN) to deliver a bulk of the content via IP multicast, and to utilize the CDN and multipath connectivity between the content source and the receiver devices to deliver the remaining portions of the content via unicast.

18 Claims, 9 Drawing Sheets

SYSTEM AND METHOD FOR BYPASSING A CONTENT DELIVERY NETWORK (CDN)

BACKGROUND

In recent years, streaming technologies and content delivery networks (CDNs) have grown in popularity and use. Generally, a CDN is geographically distributed group of servers that work together, and which could be used to deliver content (e.g., multimedia streams, files, documents, etc.) to end user devices over an Internet Protocol (IP) network. The servers in a CDN do not host content and do not replace the need for a web host. Rather, they operate to cache content at the edge of the network for faster and more reliable delivery of the content to receiver devices.

Due to these trends, content providers, service provider, and end users are all increasingly using streaming technologies and CDNs to stream high resolution video (e.g., 4K) and other files. However, conventional CDNs may require a large amount of digital information to be communicated both upstream and downstream between the end user receiver devices and the encoder or content provider. These upstream and downstream communications may consume a significant amount of the network's available resources.

SUMMARY

The various aspects include methods of delivering content to one or more receiver devices over an internet protocol (IP) network, including bypassing a content delivery network (CDN) of the IP network to deliver a bulk of the content to the one or more receiver devices via multicast, and delivering a remaining portion of the content to the one or more receiver devices via the CDN using unicast. In some aspects, delivering the remaining portion of the content to the one or more receiver devices via the CDN using unicast provides backwards compatibility and resiliency. In some aspects, the operations for bypassing the CDN to deliver the bulk of the content to the one or more receiver devices via multicast and delivering the remaining portion of the content to the one or more receiver devices via the CDN using unicast includes partitioning the content into one or more segments, partitioning the segments into addressable data cells that each include a cell header that includes at least one of multi-path address information or metadata identifying a data stream associated with the content, and sending the addressable data cells to a network component for delivery to the one or more receiver devices. In some aspects, the methods may further include receiving the addressable data cells in the network component, and joining, via the processor of the network component, a data stream associated with the content based on the information included in the received addressable data cells. In some aspects, sending the addressable data cells to the network component for delivery to the one or more receiver devices includes sending the addressable data cells to at least one or more of a CDN edge device, an IP broadcast capable device, or a customer-premises equipment (CPE) device. In some aspects, sending the addressable data cells to the network component for delivery to the one or more receiver devices may include sending the addressable data cells to the IP broadcast capable device. In some aspects the IP broadcast capable device may be an IP multicast device.

Further aspects may include a computing system having a processor configured with processor-executable instructions to perform various operations corresponding to the methods discussed above.

Further aspects may include a computing system having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
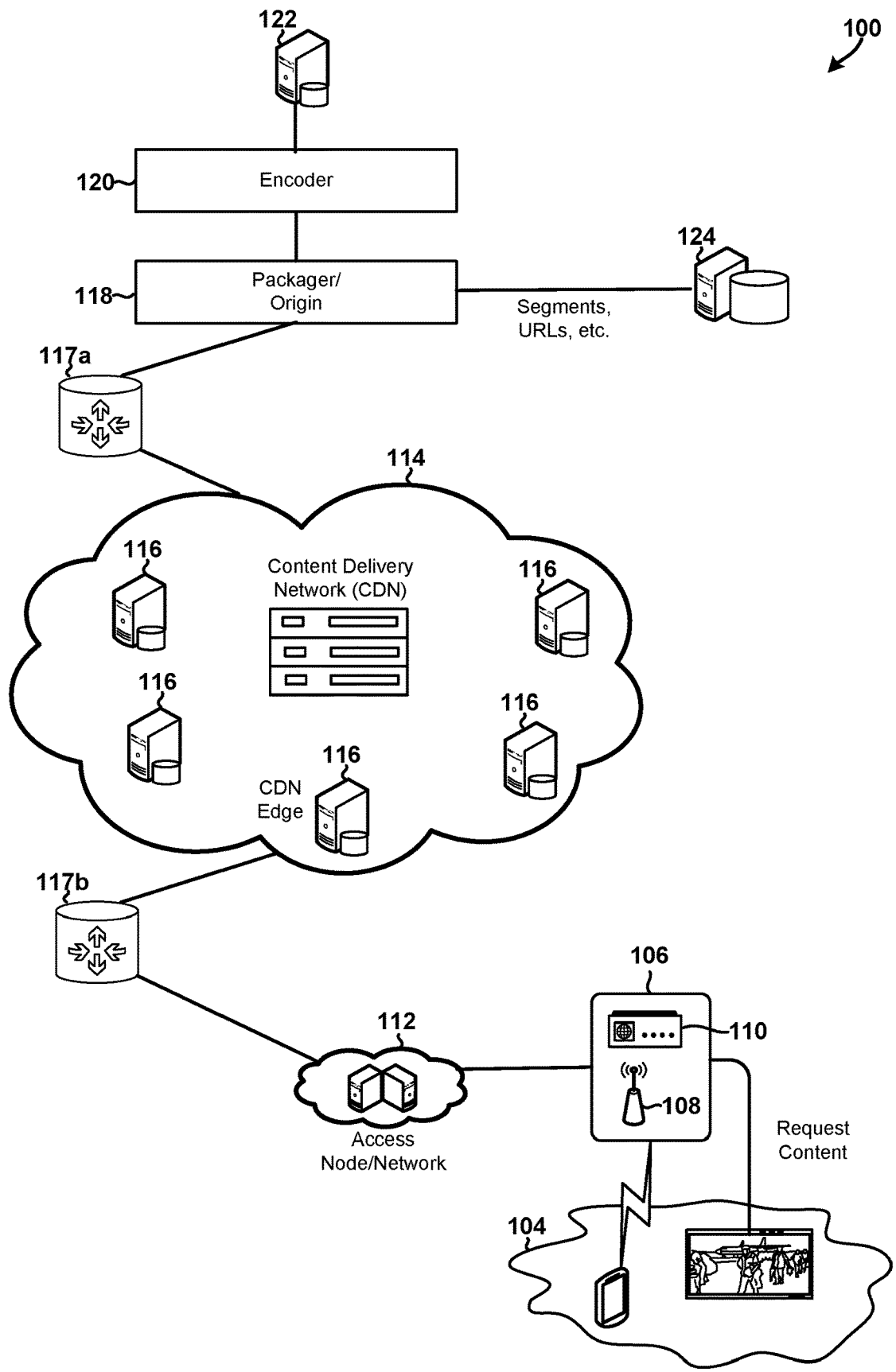
FIG. 1A is a block diagram of an example network that could be configured to deliver content via unicast over a multi-tier content delivery network (CDN).

The various embodiments are described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices (e.g., packagers, network servers, routers, etc.) configured to implement the methods, for efficiently delivering content (e.g., multimedia streams, video files, documents, images, text, operating system updates, app store downloads, etc.) from a content source to one or more end user receiver devices over an internet protocol (IP) network.

In some embodiments, the computing devices may be configured to bypass a content delivery network (CDN) to deliver a bulk of the content (e.g., 99% of the content, etc.) via IP multicast, and to utilize the CDN and multipath connectivity between the content source and the end user receiver devices to deliver the remaining portions of the content via unicast. Further, unlike conventional solutions that use a heavyweight connected protocol (e.g., transmission control protocol (TCP), etc.), computing devices configured in accordance with the embodiments may use a lightweight connectionless protocol (e.g., UDP, etc.) to deliver the content to the end user receiver devices while reducing network latency, improving reliability, and/or otherwise ensuring a high quality of service (QoS) or quality of experience (QoE).

Terms such as "component," "system," and the like may be used in this application refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing system. By way of illustration, both an application running on a computing system and the computing system may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

For ease of reference, the term "broadcast" is used generically herein to refer to any of a wide variety of network addressing schemes or transmission techniques or technologies that are suitable for sending information to one or many end user receiver devices in a single transmission. As such, the term "broadcast" encompasses unicast, broadcast, multicast, anycast, geocast and other similar transmission or addressing schemes, techniques or technologies.

The terms "multicast" and "IP multicast" are used herein to refer to a network addressing scheme or transmission technology that accomplishes one-to-many communication over an IP network. Multicast delivery may allow a single network stream (or flow, communication channel, etc.) to provide files to multiple destination nodes (e.g., receiver devices, etc.) simultaneously without additional overhead. The destination nodes may send an Internet Group Management Protocol (IGMP) message (e.g., IGMP join message, IGMP leave message, etc.) to a content source to join or leave a multicast stream. The content source is generally only required to send a packet (e.g., UDP packet) once, even if it needs to be delivered to a large number of destination nodes.

The User Datagram Protocol (UDP) is a lightweight connectionless protocol, and the most common transport layer protocol used by IP multicast systems. UDP is sometimes is referred to as an "unreliable data network datagram" because the UDP layer does not retain information regarding the state of UDP messages once they are sent, and provides little or no guarantees to the upper layer protocols for message delivery or ordering.

The term "receiver device" is used herein to refer to any end-user electronic device that includes a programmable processor, memory, and circuitry for receiving information and files, including any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU™ or CHROMECAST™ or FIRE TV™), smart televisions, digital video recorders (DVRs), smart thermostats, voice activated assistants, smart appliances, in-vehicle systems, cameras, and similar electronic devices which include a programmable processor and memory and circuitry for receiving information and files.

The terms "computing device" and "computing system" may be used herein to refer to any electronic device or system that includes a programmable processor, memory and/or circuitry for providing the functionality described herein. As such, a computing system may include any one or all of modems, routers, network switches, network bridges, residential gateways (RG), access nodes (AN), bridged residential gateway (BRG), fixed mobile convergence products, home networking adapters and Internet access gateways that enable consumers to access communications service providers' services, satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (for example, ROKU™), smart televisions, digital video recorders (DVRs), and similar electronic devices that include a programmable processor and memory and circuitry for providing the functionality described herein.

A number of different communication services, standards, and technologies are available or contemplated in the future, all of which may implement and benefit from the various embodiments. Such services, standards and technologies include, e.g., multimedia broadcast/multicast service (MBMS), enhanced multimedia broadcast/multicast service (eMBMS), enhanced multi-broadcast service (eMBS), global broadcast service (GBS), open mobile alliance mobile broadcast services enabler suite (OMA BCAST), digital video broadcast Internet protocol datacasting (DVB-IPDC), digital video broadcasting-handheld (DVB-H), digital video broadcasting-satellite services to handhelds (DVB-SH), digital video broadcasting-handheld 2 (DVB-H2), advanced television systems committee-mobile/handheld (ATSC-M/H), China multimedia mobile broadcasting (CMMB), advanced television systems committee terrestrial (ATSC-T), MPEG Media Transport (MMT), MPEG Media Transport Protocol (MMTP), Hypertext Transfer Protocol (HTTP) based and/or Internet Protocol (IP) Multimedia Subsystem (IMS) multimedia telephony technology, Real-Time Messaging Protocol (RTMP), Hybrid Management Sub-Layer (HMS), HTTP Live Streaming (HLS), Dynamic Adaptive Streaming over HTTP (DASH), MPEG DASH (MPEGDASH), Multimedia Telephony Services for IMS (MTSI), etc. Each of these broadcast standards, services, and technologies include, for example, communication channels suitable for communicating data, signaling, and/or content messages.

In addition to the services mentioned above, multimedia and other services may be delivered directly to individual receiver devices via various cellular and wireless communication services and standards, any or all of which may implement and benefit from the various embodiments. Such services and standards include, e.g., third generation partnership project (3GPP), long term evolution (LTE) systems, third generation wireless communication technology (3G), fourth generation wireless communication technology (4G), new radio (NR) or fifth generation wireless communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these technologies involves, for example, the transmission and reception of voice, data, signaling, and/or content messages.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include 3GPP, LTE systems, low earth orbit (LEO), medium earth orbit (MEO) and geostationary (GEO) satellite based systems, 3G, 4G, 5G, GSM, UMTS, HSDPA, 3GSM, GPRS, CDMA systems, AMPS, digital AMPS, EV-DO, DECT, WiMAX, WLAN, WPA, LMR, and iden. Each of these wired and wireless technologies involves, for example, the transmission and reception of data, signaling and/or content messages.

It should be understood that any references to terminology and/or technical details related to an individual standard or technology are for illustrative purposes only, and are not intended to limit the scope of the claims to a particular communication system or technology unless specifically recited in the claim language. For example, for ease of reference, some embodiments are discussed with reference to a cable modem termination system (CMTS) or an access network/node (AN) that is, includes or utilizes a CMTS. However, in should be understood that the embodiments discussed and described herein could be also be implemented in or used by ILEC/CLEC type operators over DSLAM or Mobile Wireless with the same multicast efficiency gains or other communication technologies. As such, it should be understood that the claims apply to any access distribution technology, and that nothing in this application should be used to limit the scope of the disclosure to a CMTS or Cable MSO specific technology unless explicitly recited.

Figure 1B:
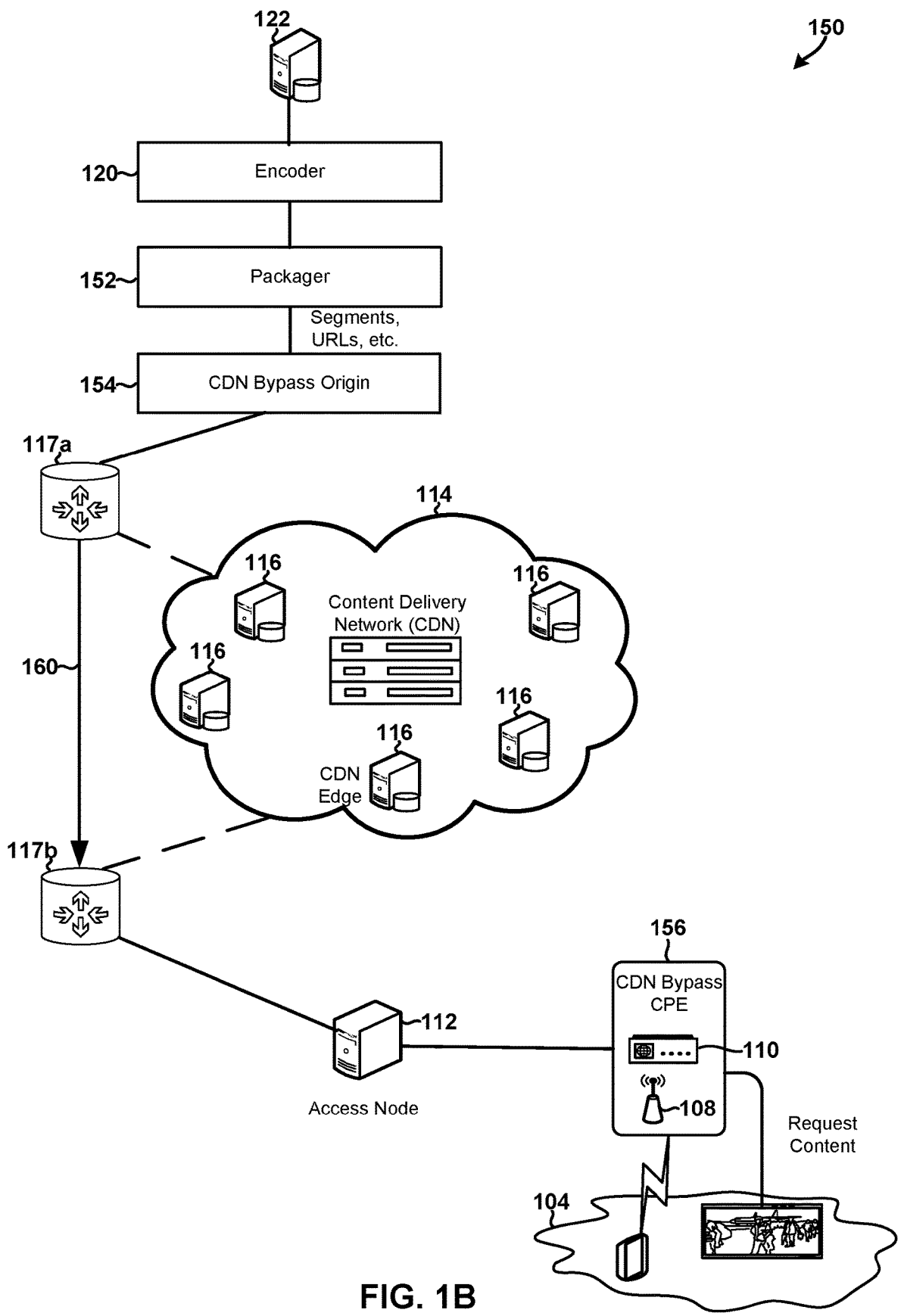
FIG. 1B is a block diagram of a network that could be configured to deliver content via a combination of IP multicast and unicast to improve the performance of the network in accordance with some embodiments.

FIGS. 1A and 1B illustrate networks 100, 150 suitable for delivering content (e.g., multimedia stream, audio-video stream, video file, text, etc.) in accordance with some embodiments. In particular, FIG. 1A illustrates a network 100 suitable for delivering content via unicast over a multi-tier content delivery network (CDN). FIG. 1B illustrates a network 150 that is suitable for delivering content via a combination of IP multicast and unicast, and to bypass the CDN for a bulk of the content delivery in accordance with the various disclosed embodiments.

In the example illustrated in FIG. 1A, the network 100 includes end-user receiver devices 104, a customer premise equipment (CPE) 106 device that may include a bridged residential gateway (BRG) 108 and a cable modem (CM) 110, an access network/node (AN) 112 (e.g., cable modem termination system (CMTS), etc.), a multi-tier content delivery network (CDN) 114 that includes CDN edge 116 devices, routers 117a and 117b, a packager/origin 118 component, a encoder 120 component, a content server 122, and a local packager/origin mount point 124. In some embodiments, the encoder 120 may be a transcoder or video encoder (e.g., a multicast video encoder, etc.). In some embodiments, the CDN 114 may be a virtual CDN (vCDN) that includes virtual caches that are deployed dynamically (e.g., as virtual machines, containers, etc.) in physical servers that are distributed across the service provider network. In some embodiments, the local packager/origin mount point 124 may include a webserver, database, and/or shield cache that is logically positioned between a remote point of presence (PoP) and an origin server (e.g., the packager/origin 118 component, etc.).

The content server 122 and/or encoder 120 may be configured to receive and store various different types of content, such as raw video files or video streams (e.g., packetized MPEG transport streams, etc.). The encoder 120 may be configured to encode the content for delivery to the packager/origin 118 component and/or to create one or more broadcasts (e.g., a unicast or multicast flow, stream, or communication channel, etc.) that the packager/origin 118 may join to receive the encoded content. The packager/origin 118 may be configured to join a broadcast to receive encoded content, convert the received content into time-based or size-based segments, send the segments to the CDN 114, and/or store the segments on the local packager/origin mount point 124.

An end-user receiver device 104 may request content by issuing a request for a corresponding manifest file to a CDN edge 116 device (e.g., via the CPE 106, AN 112, router 117b, etc.). The CDN edge 116 device may first determine whether the CDN edge 116 device locally stores information suitable for locating and retrieving the requested manifest file (or the corresponding segment, content, etc.). That is, each CDN edge 116 device (and any or all of the components in the communication path between the CDN 114 and the end-user receiver device 104) may include or may be associated with a local cache memory, and may be configured to cache or store any or all of content that they receive, generate or send in their respective local cache memories. The content is typically not cached/stored along with a file-handle that is useful outside of the component/node itself. As such, other components or nodes in a conventional CDN may not be able to access, retrieve or use the information stored in these caches. However, each component, upon receiving a request for content, could be configured to check its respective cache for the requested information.

Thus, in the above example, if the CDN edge 116 device determines that it locally stores information suitable for locating and retrieving the requested manifest file (or the corresponding segment, content, etc.), it may retrieve the requested information from the local memory and deliver the requested file to the receiver device 104. On the other hand, if the CDN edge 116 device determines that it does not locally store information suitable for locating and retrieving the requested manifest file (or the corresponding segment, content, etc.), it may request the manifest file or its corresponding content from another component in another tier of the multi-tier CDN 114 by sending additional information upstream. In response to receiving such a request, the component(s) in the CDN 114 may perform various operations to determine the URL associated with the requested manifest file, identify the packager/origin 118 to which the URL is mapped, retrieve the requested content from the identified packager/origin 118 (or local packager/origin mount point 124), and deliver the requested content to the CDN edge 116 device. The CDN edge 116 device may then receive, cache, and deliver the content to the receiver device 104.

Thus, in the system 100 illustrated in FIG. 1A, every time that a component (e.g., the CDN edge 116 device, etc.) does not locally store information suitable for locating and retrieving the requested manifest file (or the corresponding content), additional information is sent upstream through the CDN 114 to packager/origin 118, and then back downstream from the packager/origin 118 to the CDN edge 116 device, router 117*b*, AN 112, CPE 106, etc., filling the caches along the way. While these operations are often preformed relatively quickly, they could have a significant negative or user-perceivable impact on mission critical or real-time systems (e.g., video streaming applications, etc.) for which each millisecond is important. To overcome these and other challenges, some embodiments (e.g., the embodiments discussed below with reference to FIG. 1B, etc.) may include components configured to bypass the CDN 114 to deliver a bulk of the requested content (e.g., 98% of the requested content, 99% of the requested content, 99.9% of the request content, etc.) to the receiver devices 104 via IP multicast. These components may deliver the remaining content via the CDN 114 and/or unicast.

FIG. 1B illustrates a network 150 that is suitable for delivering content via a combination of IP multicast and unicast to improve the performance of the network in accordance with some embodiments. The network 150 may be configured to deliver the bulk of the segments/content via IP multicast, and use unicast only for the segments/content that are not delivered or received via IP multicast. In the example illustrated in FIG. 1B, the network 150 includes end-user receiver device(s) 104, a CDN Bypass CPE 156 device that includes a BRG 108 and a CM 110, routers 117*a-b*, a AN 112, a CDN 114 that includes CDN edge 116 devices, a packager 152, a CDN Bypass Origin 154 component, an encoder 120 component, a content server 122, and a bypass link 160 between the routers 117*a* and 117*b* that, as is discussed below in more details, allows the system 150 to bypass the CDN 114.

The encoder 120, packager 152 and/or CDN Bypass Origin 154 may be configured to perform the same or similar operations as the encoder 120 and packager/origin 118 discussed above with reference to FIG. 1A. However, in addition to (or instead of) storing the segments on the local packager/origin mount point 124, in some embodiments, the packager 152 or the CDN Bypass Origin 154 may be configured to wrap or decorate the segments so that they include additional information (e.g., multi-path address information, etc.), and to push the wrapped/decorated segments into an object store that is accessible to or associated with the CDN Bypass Origin 154 component. The CDN Bypass Origin 154 may partition the segments into addressable data cells that are directly addressable via HTTP in the case of missed or missing data, and send the addressable data cells via bandwidth paced IP multicast communications.

As mentioned above, the components (e.g., packager 152, CDN Bypass Origin 154, etc.) may be configured to wrap or decorate the segments so that they include additional information (e.g., multi-path address information, etc.). In some embodiments, wrapping or decorating the segments may include adding a special header (e.g., X-CDN-Bypass header, HTTP headers, etc.) to the packets/segments that includes a IP multicast decoration (e.g., metadata, multi-path address information, etc.). In some embodiments, wrapping or decorating the segments may include the packager 152 adding labels, tags, or information associating the naming convention with Multicast Yes/No, a unique ID, a stream bitrate BW, and/or other similar information. In these embodiments, the CDN Bypass Origin 154 may be configured to receive the file or segment, generate the multicast information, add the headers that include the IP multicast decorations (e.g., metadata, multi-path address information, etc.) and/or generate a manifest file, partition the content into addressable data cells, and/or to send, transmit or spool the addressable data cells via multicast.

In some embodiments, the components (e.g., packager 152, CDN Bypass Origin 154, etc.) may be configured to generate or decorate a manifest file with an additional JavaScript Object Notation (JSON) source document for the client (receiver devices 104) to obtain IP multicast source/group/port for a IGMP message (i.e., a join or leave message). Alternatively or in addition to generating or decorating the manifest files with the additional the JSON source document, in some embodiments the components may configured to generate or decorate manifest files with HTTP headers (provided that the existing CDN will pass through these headers).

As mentioned above, the components (e.g., packager 152, CDN Bypass Origin 154, etc.) may be configured to partition the content/segments into the addressable data cells. Each individual addressable data cell may contain metadata identifying the content and data flow it belongs to for reassembly and delivery to the receiver devices 104. The addressable data cells may be addressed by filename when requested via HTTP unicast. Addressable data cells arriving via multicast may include headers that include a unicast path for getting or retrieving the cells, and a file identifier that is unique to the requested content for the lifetime of the relevant cache.

To obtain a missed data cell, the CDN Bypass Origin 154 may issue a request, such as http://cdn/path/to/content/12345.192 where 12345 is the contentID and 192 is the missed cell number, leaving the rest of the URL so that the CDN has a path back to CDN Bypass Origin 154 for the content. In response, the CDN Bypass Origin 154 may receive a binary payload for the missed data cell (i.e., missed cell number 192). The response message may or may not include headers. In the multicast UDP context, headers are useful because the system may not have any other way to identify the data coming in. In the unicast context, the system may identify the data and continue with reassembly even when there are no headers.

These and other features of the network 150 (e.g., wrapping or decorating the segments, etc.) may allow the network to deliver streaming content without using a centralized control plane. The network 150 may work in conjunction with the CDN 114 so that the bulk of the dataflow (IP multicast) simply bypasses the CDN. The CDN 114 may continue to serve non-bypass enabled customers in addition to the occasional unicast requests from bypass customers for data fill.

Similar to the process discuss above with reference to FIG. 1A, the receiver device 104 may request content by issuing a request for a corresponding manifest file to the CPE 106, which may send the request to the AN 112 component that issues the request to a CDN edge 116 device. However, unlike the process discuss above with reference to FIG. 1A, the AN 112 component and/or the other components in the network 150 may be configured to determine whether the request message or requested segment includes or is associated with a special header that includes multicast decorations (e.g., multi-path address information, etc.).

To support backward compatibility, if the message/segment does not include the special header, the network components may perform any or all of the operations discussed above with reference to FIG. 1A to retrieve and deliver the content via unicast. For example, when a CDN edge 116 device does not locally store information suitable for locating and retrieving a requested manifest file (or the corresponding content), the CDN edge 116 device may request the manifest file (or the corresponding content) from another component in the network 150. In response to receiving such a request, the component(s) may determine the URL associated with the requested manifest file and identify the packager/origin 118 to which the URL is mapped. The components may then retrieve and deliver the requested content to the CDN edge 116 device, which may then deliver the content to the receiver device 104.

On the other hand, if the message/segment is determined to include the special header, the components may use the multi-path address information included in the special header to locate and retrieve the request content and/or predicted future content.

In addition, the components along the communication path between the AN 112 component device and packager 152 may each be configured to optionally join the IP multicast stream and store copies of upcoming segment in their respective caches before the receiver device 104 request another segment. When the receiver device 104 requests the content, these components my retrieve the content from the cache memories and send the retrieved content to the receiver devices. This makes initial stream setup for additional users quicker/more efficient as well as having the addressable cells for repair available for quicker/more efficient delivery. This also supports customers who don't have CDN Bypass CPE equipment in the home; their CDN Edge egress point may gain efficiency (network and time) by receiving files via multicast.

Figure 2:
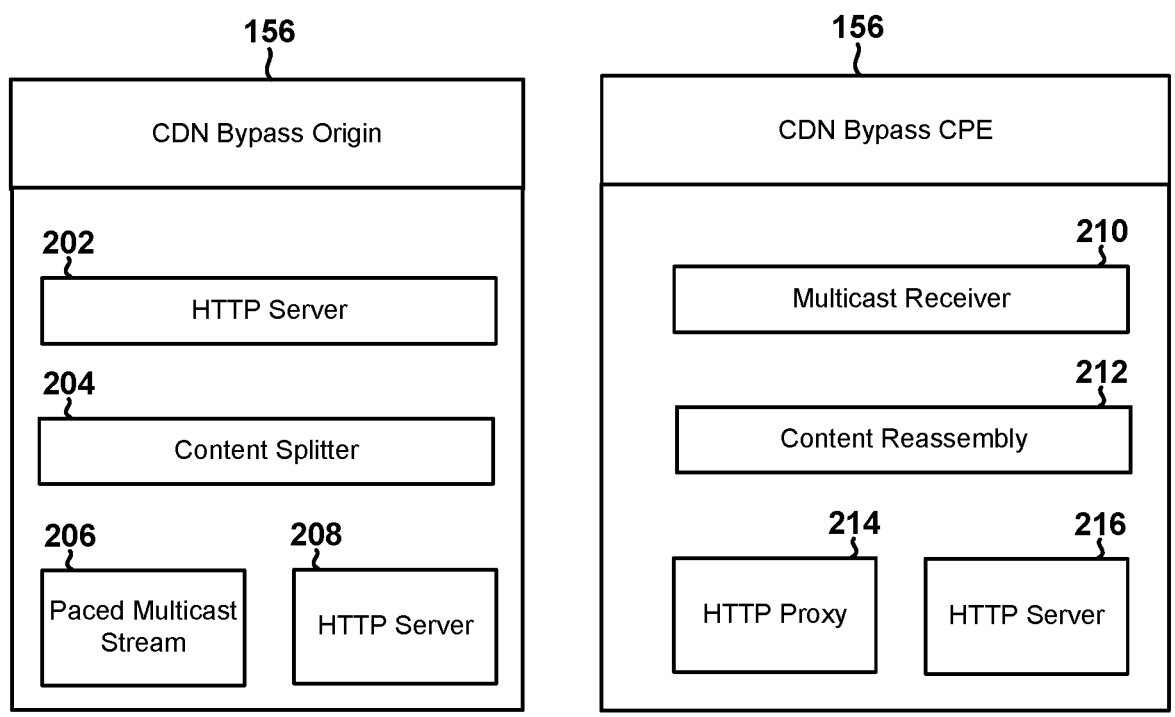
FIG. 2 is a block diagram illustrating example components that could be included in a CDN bypass origin component and/or a CDN bypass customer-premises equipment (CPE) configured to deliver content via a combination of IP multicast and unicast in accordance with some embodiments.

FIG. 2 illustrates example components that could be included in a CDN Bypass Origin 154 component and CDN Bypass CPE 156 device in some embodiments. In the example illustrated in FIG. 2, the CDN Bypass Origin 154 component includes an HTTP server 202 (e.g., HTTP Put Server, HTTP Post Server, etc.), a content splitter 204, a paced multicast stream 206 component, and an HTTP server 208. The CDN Bypass CPE 156 device includes a multicast receiver 210, a content reassembly 212 component that reassembles content from addressable data cells, an HTTP proxy 214 component, and an HTTP server 216.

The HTTP server 202 may be configured to accept standard HTTP Put data submissions from the packager 152.

The content splitter 204 component may be configured to divide content into addressable data cells. For example, the content splitter 204 may calculate a checksum for data submitted to the HTTP server 202, and partition the data into configurable sized addressable data cells, and place the addressable data cells into a send queue of the paced multicast stream 206.

The paced multicast stream 206 component may be configured to send or stream the content by sending the addressable data cells in its send queue to the multicast receiver 210 of the CDN Bypass CPE 156. Each content flow/stream may be associated with a unique multicast group, source, and/or port. In some embodiments, each of these flows/streams may include a configurable multicast flow data rate, and the paced multicast stream 206 component may be configured to send the addressable data cells at or near the data rate defined for each flow/stream.

The HTTP server 208 may be configured to cache the addressable data cells created by the content splitter 204. The HTTP server 208 may also be configured to insert the addressable data cells into the IP multicast flow/stream of the paced multicast stream 206 component for unicast delivery (e.g., for instant startup, data correction, etc.).

The multicast receiver 210 may be configured to receive the addressable data cells from the paced multicast stream 206, store them in a cache, and notify the content reassembly 212 component that the addressable data cells have arrived.

The content reassembly 212 component may be configured to receive the notifications multicast receiver 210, determine whether any of the addressable data cells are missing from the received data, request missing addressable data cells via the multicast receiver 210 and HTTP server 208, and reassemble the addressable data cells to regenerate the content or data from the packager 152.

The HTTP proxy 214 component may be configured to operate as a gateway to request individual addressable data cells or whole files for reassembly by the content reassembly 212 component and/or reception by the paced multicast stream 206 component (e.g., for instant stream startup, etc.). The HTTP proxy 214 component may also be configured to provide a content path for non-bypass enabled content and/or for fallback when only unicast is available.

The HTTP server 216 may be configured to serve the content to the receiver devices 104. The HTTP server 216 may also request content that is not stored in cache from the HTTP proxy 214 component and paced multicast stream 206 component. If a the receiver device 104 supports chunked transfer encoding, the HTTP server 216 may optionally deliver partial content by sending addressable data cells up to the missing addressable data cell, while waiting for the addressable data cells to arrive from upstream either via IP multicast or unicast, then completing the transfer to the receiver devices 104 as the addressable data cells become available through completion. The CDN Bypass CPE 156 may use the video manifest requests as a "keepalive" mechanism for the IP multicast join. The keepalive time may be a segment target duration plus a few seconds. When a flow's keepalive expires, the system may perform an IGMP leave to stop the multicast flow into the CDN Bypass CPE 156 and purge all cached content for that flow.

As an example, the CDN Bypass Origin 154 component may be configured to accept content via unicast HTTP server 202, split the content data into addressable data cells via the content splitter 204 component, and stream the content over IP multicast via the paced multicast stream 206 component. Simultaneously, the CDN Bypass Origin 154 component may operate the unicast HTTP server 208 for error correction with the IP multicast flow, instant video startup, etc. The unicast HTTP server 208 may create a secondary JSON extension file (and/or HTTP headers, etc.) for video manifests which the CDN Bypass CPE 156 requests via standard CDN unicast path to obtain multicast source/group/port information to complete the IP multicast bypass join without the need for a control plane. In this example, the CDN 114 (illustrated in FIG. 1B) may serve as a cache between the CDN Bypass Origin 154 component and the CDN Bypass CPE 156. Components in the CDN 114 may optionally join the IP multicast flow, serve bypass clients (e.g., CDN Bypass CPE 156, etc.) and/or serve non-bypass clients (e.g., CPE 106, etc.).

As mentioned above, in some embodiments, HTTP headers may be used in addition to or alternate to the JSON file (provided the existing CDN will pass through these headers). For example, the HTTP Header X-CDN-Bypass: {json data} may be used. In addition, the same JSON data string could be placed into the HTTP header as the manifest file (e.g., manifest.m3u8.json file). For example, X-CDN-Bypass: {"group": "239.29.2.4", "source": "10.102.22.3", "port": 10000, "sourceid": 100492}. Using an HTTP header may save time and resources because the system doesn't need to make a new unicast HTTP request to obtain the data, and it can signal the system to initiate the IGMP join before the unicast request has completed.

The CDN Bypass CPE 156 may be configured to extend the content egress beyond the AN 112 into the customer home. This may provide significant bandwidth savings as well as improved customer experience with reduced latency.

Figure 3:
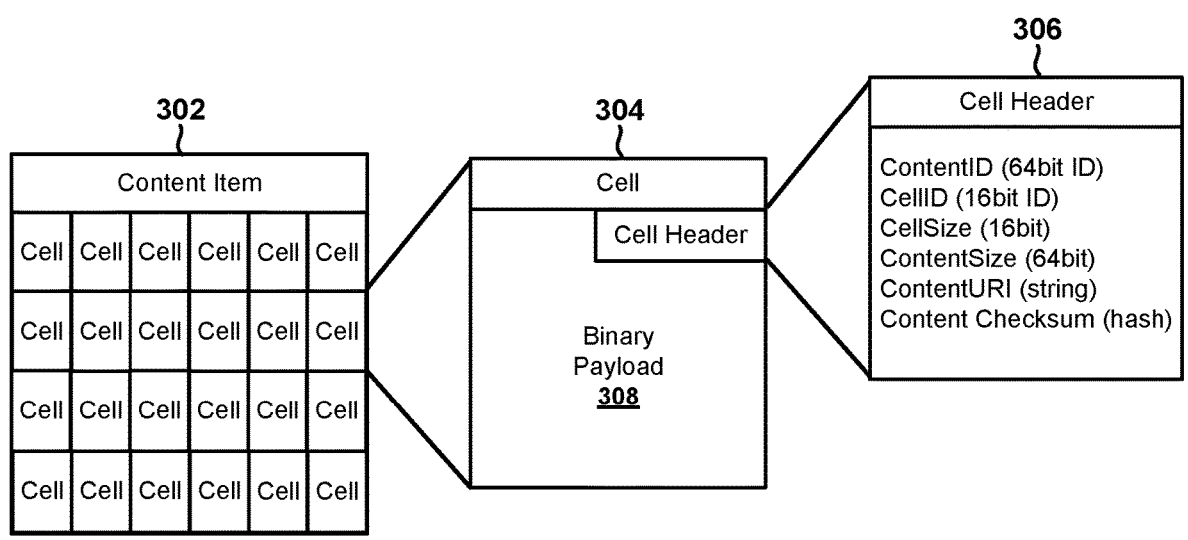
FIG. 3 is a block diagram of a content item that is split or divided into a plurality of individually addressable data cells in accordance with an embodiment.

FIG. 3 illustrates that a content item 302 may be split or divided into a plurality of individually addressable data cells 304. Each of the individually addressable data cells 304 may include a cell header 306 and a binary payload 308.

The cell header 306 may include information for reassembling content at the correct source URI for delivery to a receiver device. In the example illustrated in FIG. 3, the cell header 306 includes a ContentID (64 bit ID) header field, a CellID (16 bit ID) header field, a CellSize (16 bit) header field, a ContentSize (64 bit) header field, a ContentURI (string) header field, and a Content Checksum (hash) header field. Additional header fields could be added for specialized content, if needed.

Figure 4:
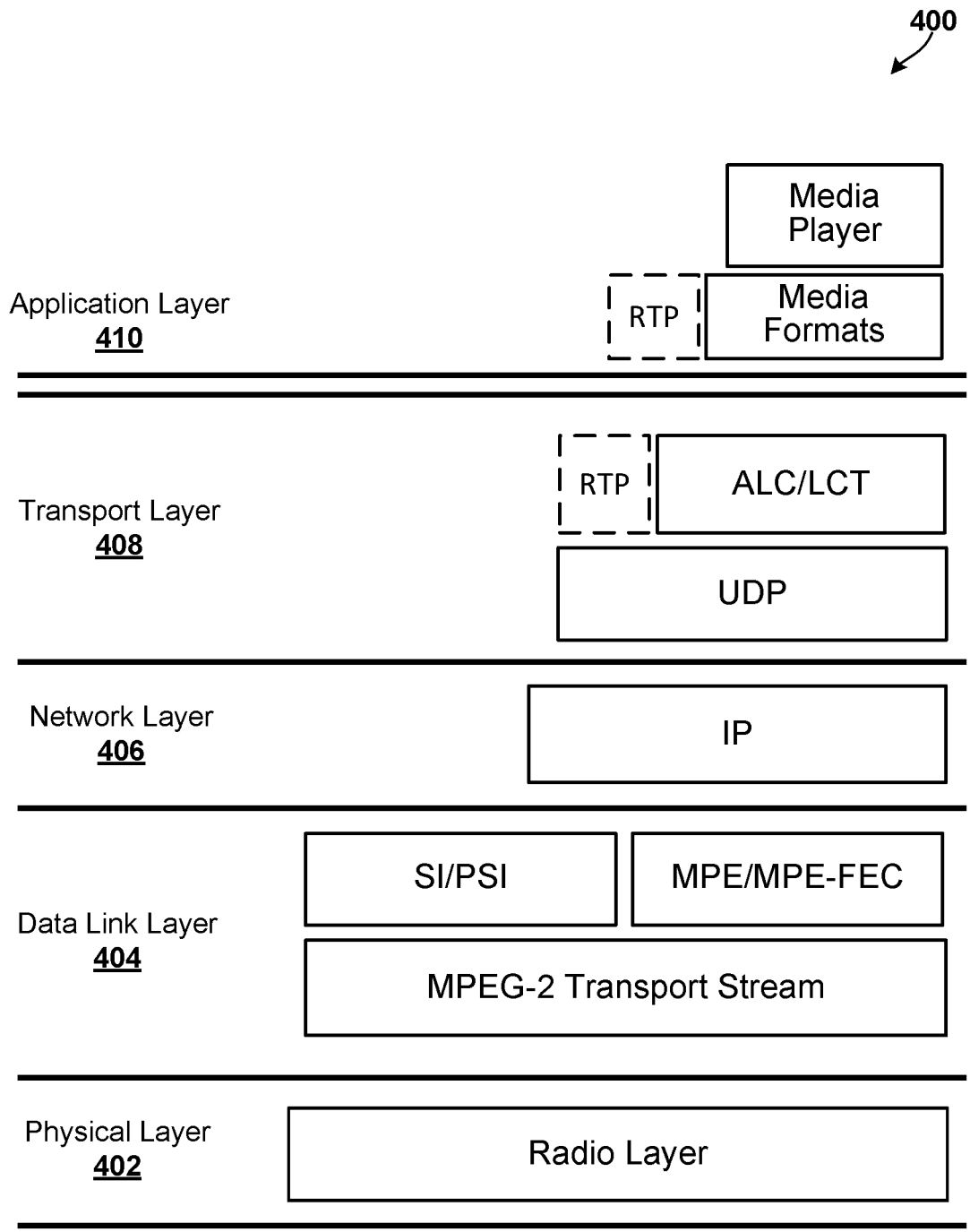
FIG. 4 is a stack diagram illustrating information flows through the various hardware and software protocol layers and modules that may be used by some embodiments.

FIG. 4 illustrates an example protocol stack 400 of a receiver device 104 suitable for receiving and displaying content in accordance with some embodiments. In the example illustrated in FIG. 4, the protocol stack 400 includes a physical layer 402 module, a data link layer 404 module, a network layer 406 module, a transport layer 408 module, and an application layer 410 module, each of which may be implemented in hardware, in software, or in a combination of hardware and software. Further, each of the modules 402-410 may include sub-layers, which may also be implemented in hardware, in software, or in a combination of hardware and software.

The physical layer 402 module may include radio components configured to receive the basic communication signal, extract data from the communication signal, and provide the data to a media transport stream (e.g., MPEG-2 Transport Stream) or a media access control module in the data link layer 404 module. The data link layer 404 module may provide addressing and channel access control mechanisms that make it possible for various components of the receiver device to receive the different streams of data. The data link layer 404 module may also include various sub-modules or sub-layers for carrying a packet protocol (e.g., Internet Protocol) on top of a Moving Picture Experts Group (MPEG) transport stream (TS), such as the illustrated multiprotocol encapsulation forward error correction (MPE-FEC) module/layer and the program and system information (SI/PSI) module/layer.

Portions of the flow/stream/signal carrying the content and information flows may be passed by the data link layer 404 module to the network layer 406 module, which may include an IP module/interface for communicating/relaying streams, datagrams and/or packets to the transport layer 408 module. Streams and data received in the transport layer 408 module may be delivered to the appropriate transport layer sub-modules or sub-layers, which process and package the data for transport. Such transport layer sub-modules/sub-layers may include a user datagram protocol (UDP) module/layer, an asynchronous layered coding/layered coding transport (ALC/LCT) module/layer, a real-time transport protocol (RTP) module/layer, and a file delivery module/layer. In an embodiment, the RTP module/layer may be included in or as part of the application layer 410.

The application layer 410 module may include protocols and methods required establish host-to-host, end-to-end connections and to conduct process-to-process communications. The application layer 410 module may also include end-user applications (e.g., media player, etc.) for processing, rendering and/or displaying the received content on the receiver devices 104. The application layer may also include media formats, such as HLS and DASH formats, encoded media streams and other media related metadata. In the example illustrated in FIG. 4, the application layer 410 module includes a media formats module (e.g., an HLS or DASH module, etc.), an real-time transport protocol (RTP) module, and a media player module.

Figure 5:
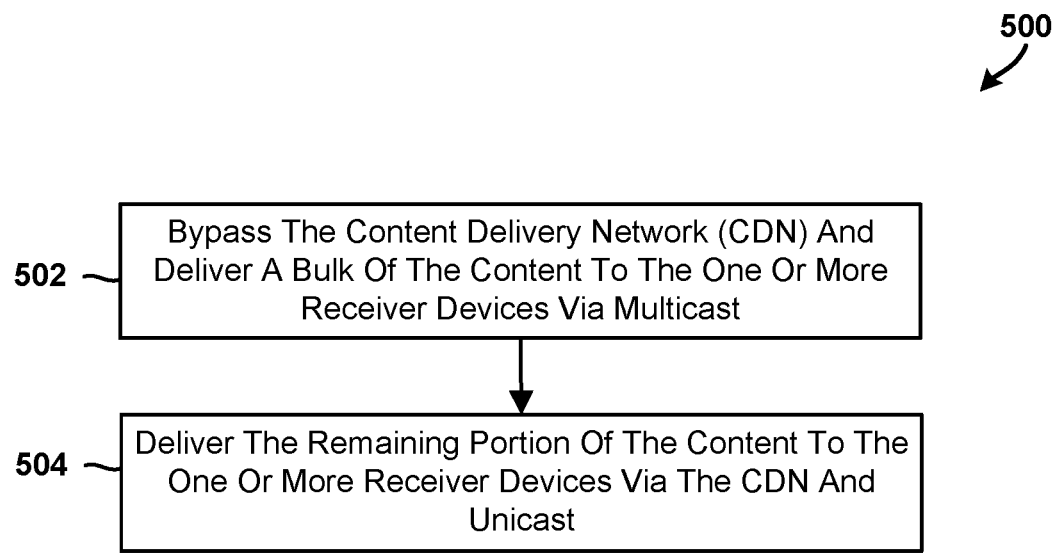
FIGS. 5-7 are process flow diagrams illustrating methods for efficiently delivering content (e.g., multimedia streams, video files, documents, images, text, operating system updates, app store downloads, etc.) from a content source to one or more end user receiver devices over an internet protocol (IP) network in accordance with some embodiments.
Figure 6:
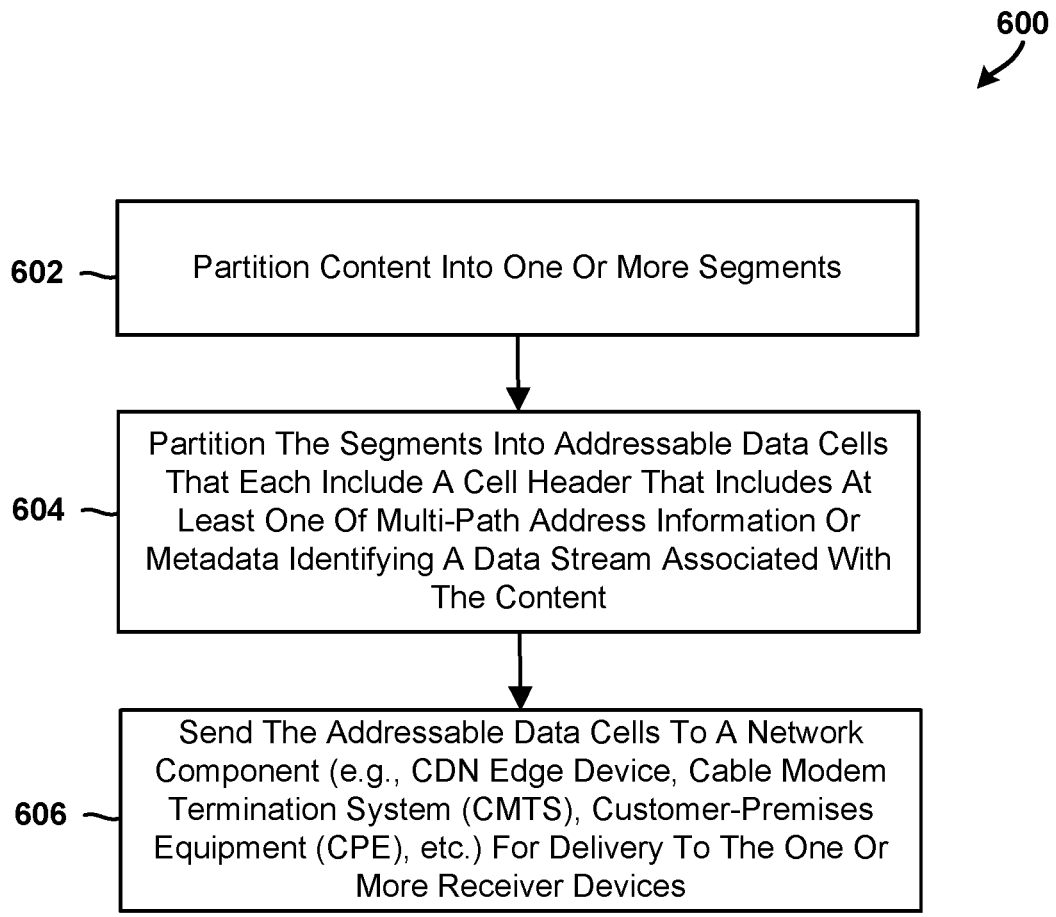
Figure 7:
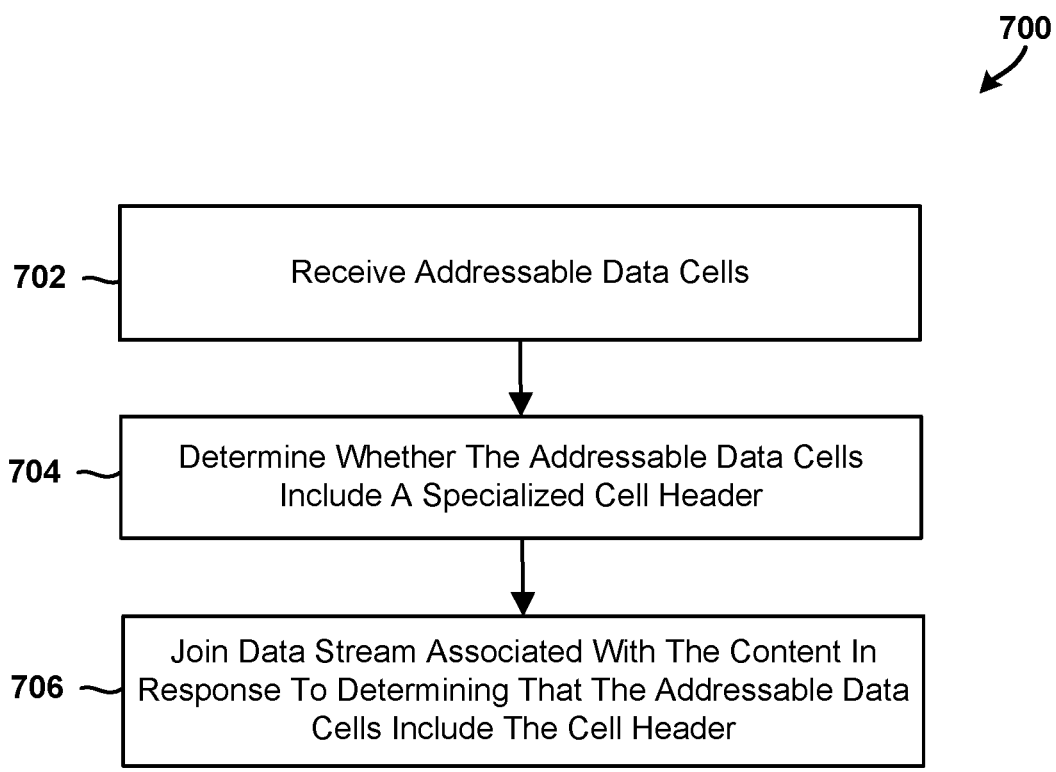

FIGS. 5-7 illustrate methods 500, 600, 700 for delivering content to one or more receiver devices over an IP network in accordance with an embodiment. Methods 500, 600, 700 may be performed or implemented by one or more processors in one or more network components.

With reference to FIG. 5, in block 502 of method 500, one or more processors in one or more network components may bypass a content delivery network (CDN) 114 and deliver a bulk of the content to the one or more end-user receiver device(s) 104 via multicast. In block 504, the one or more processors may deliver the remaining portion of the content to the one or more end-user receiver device(s) 104 via the CDN and unicast.

With reference to FIG. 6, in block 602 of method 600, one or more processors in one or more network components may partition content into one or more segments. In block 604, the one or more processors may partition the segments into addressable data cells that each include a cell header that includes at least one of multi-path address information or metadata identifying a data stream associated with the content. In block 606, the one or more processors may send the addressable data cells to a network component 116 (e.g., CDN edge device, customer-premises equipment (CPE), cable modem termination system (CMTS), etc.) for delivery to the end-user receiver device(s) 104.

With reference to FIG. 7, in block 702 of method 700, one or more processors in one or more network components may receive content in the form of segments partitioned into addressable data cells. In block 704, the one or more processors may determine whether the addressable data cells include a specialized cell header. In block 706, the one or more processors may join data stream associated with the content in response to determining that the addressable data cells include the cell header.

Thus, the embodiments include methods, and components configured to implement the methods, for delivering content to one or more receiver devices over an internet protocol (IP) network. In some embodiments the method may include bypassing a content delivery network (CDN) of the IP network to deliver a bulk of the content to the one or more receiver devices via multicast and delivering a remaining portion of the content to the one or more receiver devices via the CDN using unicast. The remaining portion of the content may be delivered via the CDN and/or using unicast so as to provide backward compatibility to legacy devices and/or resiliency in the event of failure. In some embodiments, the operations for bypassing the CDN to deliver the bulk of the content and delivering the remaining portion of the content via the CDN using unicast may include partitioning the content into one or more segments, partitioning the segments into addressable data cells that each include a cell header that includes at least one of multi-path address information or metadata identifying a data stream associated with the content, and sending the addressable data cells to a network component (e.g., to a CDN edge device, a CPE device, an IP broadcast capable device such as a IP multicast device, etc.) for delivery to the one or more receiver devices. In some embodiments, the methods may further include receiving the addressable data cells in the network component and joining, via the processor of the network component, a data stream associated with the content based on the information included in the received addressable data cells.

Figure 8:
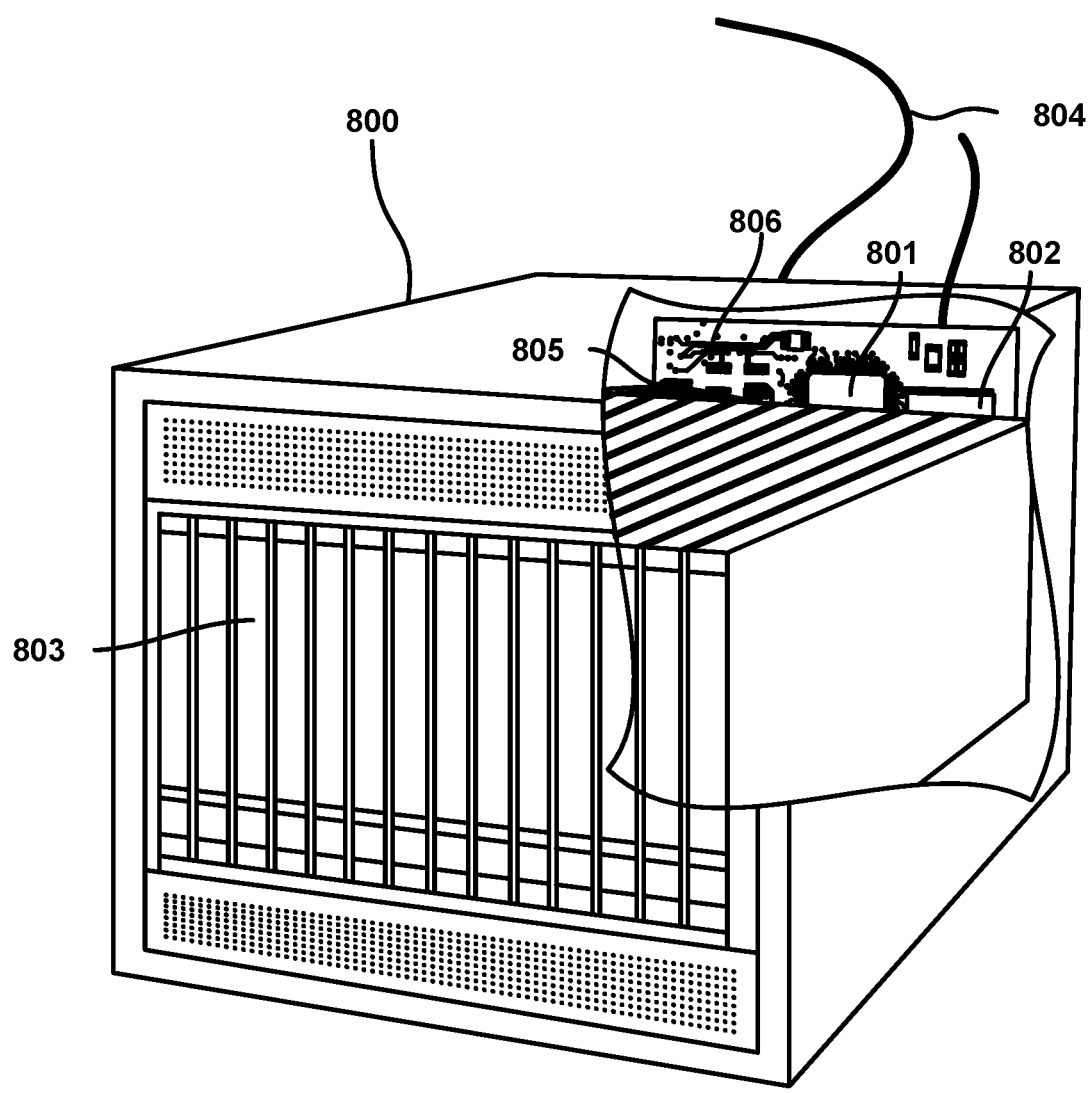
FIG. 8 is a block diagram of a server that could be configured to implement some embodiments.

Some embodiments (including, but not limited to, embodiments discussed above with reference to FIGS. 1-7) may be implemented on any of a variety of commercially available computing systems, such as the server computing device 800 illustrated in FIG. 8. Such a server device 800 may include a processor 801 coupled to volatile memory 802 and a large capacity nonvolatile memory, such as a disk drive 803, SSD, NVME, Rambus, etc. The server device 800 may also include a USB or removable disc drive coupled to the processor 801. The server device 800 may also include network access ports 806 coupled to the processor 801 for establishing data connections with a network connection circuit 804 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing systems, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, Flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of delivering content to one or more receiver devices over an internet protocol (IP) network via a content delivery network (CDN), comprising:
    dividing the content from a content source to generate content segments;
    bypassing the CDN of the IP network to deliver a majority of the generated content segments to the one or more receiver devices via multicast; and
    utilizing the CDN and multipath connectivity between the content source and the one or more receiver devices to deliver the remaining generated content segments not delivered via multicast to the one or more receiver devices via unicast.

2. The method of claim 1, wherein utilizing the CDN and multipath connectivity between the content source and the one or more receiver devices to deliver the remaining generated content segments not delivered via multicast to the one or more receiver devices via unicast provides backwards compatibility and resiliency.

3. The method of claim 1, wherein the operations for bypassing the CDN to deliver the majority of the generated content segments to the one or more receiver devices via multicast and utilizing the CDN and multipath connectivity between the content source and the one or more receiver devices to deliver the remaining generated content segments not delivered via multicast to the one or more receiver devices via unicast comprises:
    partitioning the generated content segments into addressable data cells that each include a cell header that includes at least one of multi-path address information or metadata identifying a data stream associated with the content; and
    sending the addressable data cells to a network component for delivery to the one or more receiver devices.

4. The method of claim 3, further comprising:
    receiving the addressable data cells in the network component; and
    joining, via a processor of the network component, the data stream associated with the content based on information included in the received addressable data cells.

5. The method of claim 3, wherein sending the addressable data cells to the network component for delivery to the one or more receiver devices comprises sending the addressable data cells to at least one or more of:
    a CDN edge device;
    an IP broadcast capable device; or
    a customer-premises equipment (CPE) device.

6. The method of claim 5, wherein the IP broadcast capable device is an IP multicast device.

7. A server computing device, comprising:
    a processor configured with processor-executable instructions to:
        receive content from a packager component or a request for content from one or more receiver devices; and
        deliver the content to the one or more receiver devices over an internet protocol (IP) network via a content delivery network (CDN) by:
            dividing the content from a content source to generate content segments;
            bypassing the CDN of the IP network to deliver a majority of the generated content segments to the one or more receiver devices via multicast; and
            utilizing the CDN and multipath connectivity between the content source and the one or more receiver devices to deliver the remaining generated content segments not delivered via multicast to the one or more receiver devices via unicast.

8. The server computing device of claim 7, wherein the processor is configured with processor-executable instructions to utilize the CDN and multipath connectivity between the content source and the one or more receiver devices to deliver the remaining generated content segments not delivered via multicast to the one or more receiver devices via unicast to provide backwards compatibility and resiliency.

9. The server computing device of claim 7, wherein the processor is configured with processor-executable instructions so that the operations for bypassing the CDN to deliver the majority of the generated content segments to the one or more receiver devices via multicast and utilizing the CDN and multipath connectivity between the content source and the one or more receiver devices to deliver the remaining generated content segments not delivered via multicast to the one or more receiver devices via unicast comprise:
    partitioning the generated content segments into addressable data cells that each include a cell header that includes at least one of multi-path address information or metadata identifying a data stream associated with the content; and
    sending the addressable data cells to a network component for delivery to the one or more receiver devices.

10. The server computing device of claim 9, wherein the processor is configured with processor-executable instructions to cause the network component to:
    receive the addressable data cells; and
    join the data stream associated with the content based on information included in the received addressable data cells.

11. The server computing device of claim 9, wherein the processor is configured with processor-executable instructions to send the addressable data cells to the network component for delivery to the one or more receiver devices by sending the addressable data cells to at least one or more of:
    a CDN edge device;
    an IP broadcast capable device; or
    a customer-premises equipment (CPE) device.

12. The server computing device of claim 11, wherein sending the addressable data cells to the IP broadcast capable device comprises sending the addressable data cells to an IP multicast device.

13. A non-transitory computer readable storage medium having stored thereon processor-executable software instructions configured to cause a server computing device processor to perform operations comprising:
    receiving content from a packager component or a request for content from one or more receiver devices; and delivering the content to the one or more receiver devices over an internet protocol (IP) network via a content delivery network (CDN) by:
   dividing the content from a content source to generate content segments;
   bypassing the CDN of the IP network to deliver a majority of the generated content segments to the one or more receiver devices via multicast; and
   utilizing the CDN and multipath connectivity between the content source and the one or more receiver devices to deliver the remaining generated content segments not delivered via multicast to the one or more receiver devices via unicast.

14. The non-transitory computer readable storage medium of claim 13, wherein the stored processor-executable instructions are configured to cause the server computing device processor to perform operations such that utilizing the CDN and multipath connectivity between the content source and the one or more receiver devices to deliver the remaining generated content segments not delivered via multicast to the one or more receiver devices via unicast provides backwards compatibility and resiliency.

15. The non-transitory computer readable storage medium of claim 13, wherein the stored processor-executable instructions are configured to cause the server computing device processor to perform operations such that the operations for bypassing the CDN to deliver the majority of the generated content segments to the one or more receiver devices via multicast and utilizing the CDN and multipath connectivity between the content source and the one or more receiver devices to deliver the remaining generated content segments not delivered via multicast to the one or more receiver devices via unicast comprise:
   partitioning the generated content segments into addressable data cells that each include a cell header that includes at least one of multi-path address information or metadata identifying a data stream associated with the content; and
   sending the addressable data cells to a network component for delivery to the one or more receiver devices.

16. The non-transitory computer readable storage medium of claim 15, wherein the stored processor-executable instructions are configured to cause the server computing device processor to perform operations further comprising causing the network component to perform operations comprising:
   receiving the addressable data cells; and
   joining the data stream associated with the content based on information included in the received addressable data cells.

17. The non-transitory computer readable storage medium of claim 15, wherein the stored processor-executable instructions are configured to cause the server computing device processor to perform operations such that sending the addressable data cells to the network component for delivery to the one or more receiver devices comprises sending the addressable data cells to at least one or more of:
   a CDN edge device;
   an IP broadcast capable device; or
   a customer-premises equipment (CPE) device.

18. The non-transitory computer readable storage medium of claim 17, wherein the stored processor-executable instructions are configured to cause the server computing device processor to perform operations such that sending the addressable data cells to the IP broadcast capable device comprises sending the addressable data cells to an IP multicast device.

* * * * *